United States Patent [19]

Magor

[11] 3,892,164

[45] July 1, 1975

[54] SERVO CONTROL FOR MACHINE TOOLS

[75] Inventor: Lincoln Stoddard Magor, Cambridge, Canada

[73] Assignee: Mimik Limited, Cambridge, Canada

[22] Filed: Dec. 19, 1973

[21] Appl. No.: 426,205

[52] U.S. Cl. ................................ 91/378; 91/466
[51] Int. Cl.² ............................................ F15B 9/10
[58] Field of Search .............................. 91/378, 376

[56] References Cited
UNITED STATES PATENTS

| | | | |
|---|---|---|---|
| 1,533,767 | 4/1925 | Schmidt | 91/378 |
| 2,193,898 | 3/1940 | Carter et al. | 91/378 |
| 2,244,850 | 6/1941 | Orshansky, Jr. | 91/378 |
| 2,384,962 | 9/1945 | Pohl | 91/378 |
| 2,555,755 | 6/1951 | Moore | 91/378 |
| 3,007,446 | 11/1961 | Reitman | 91/378 |
| 3,554,086 | 1/1971 | Wills | 91/376 |

FOREIGN PATENTS OR APPLICATIONS

| | | | |
|---|---|---|---|
| 451,822 | 9/1949 | Italy | 91/376 |

*Primary Examiner*—Paul E. Maslousky

[57] ABSTRACT

A servo-mechanism is designed to control the movement of a piston in a cylinder the latter two members being designed to control the movement of a machine tool part. The valve of the servo-mechanism is mounted on the piston itself and flow to control movement of the piston relative to the cylinder is provided to the servo-valve through conduits in the piston rod. Control for the servo-valve is achieved by a rod extending therefrom parallel to the rod out of the cylinder. The rod extending out of the cylinder is indented to be piston driven.

6 Claims, 3 Drawing Figures

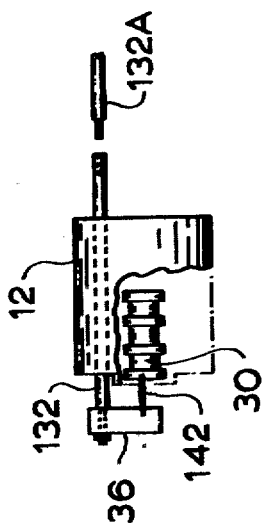
FIG. 3
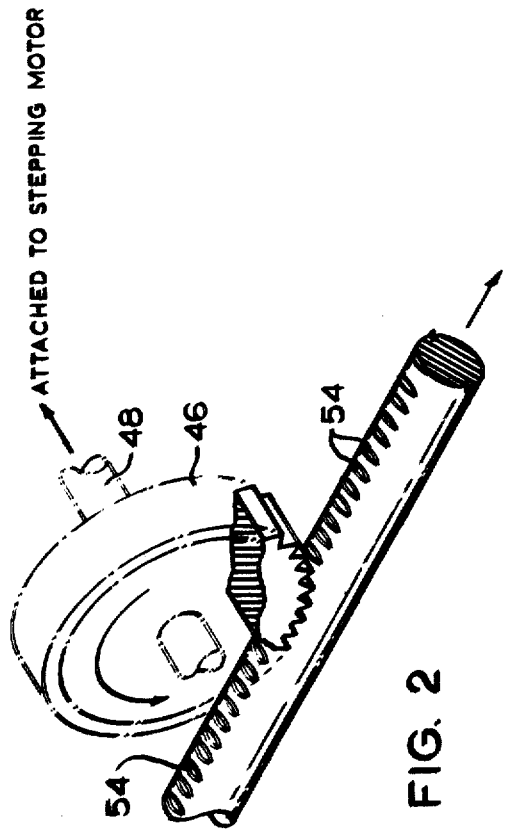
FIG. 2
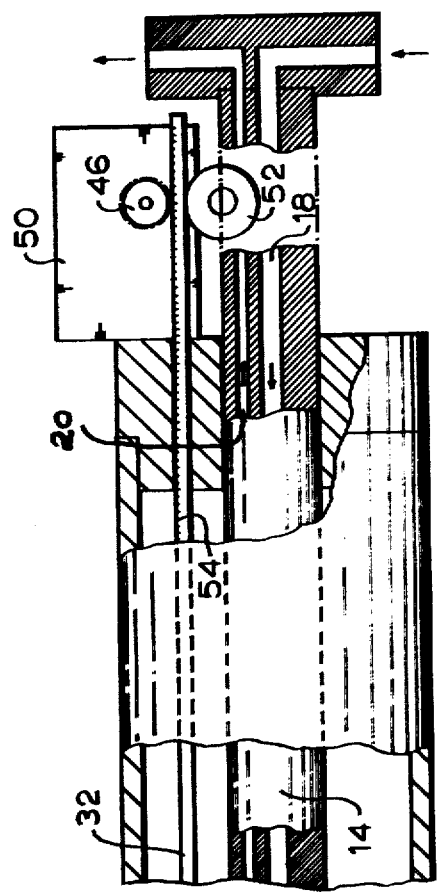
FIG. 1
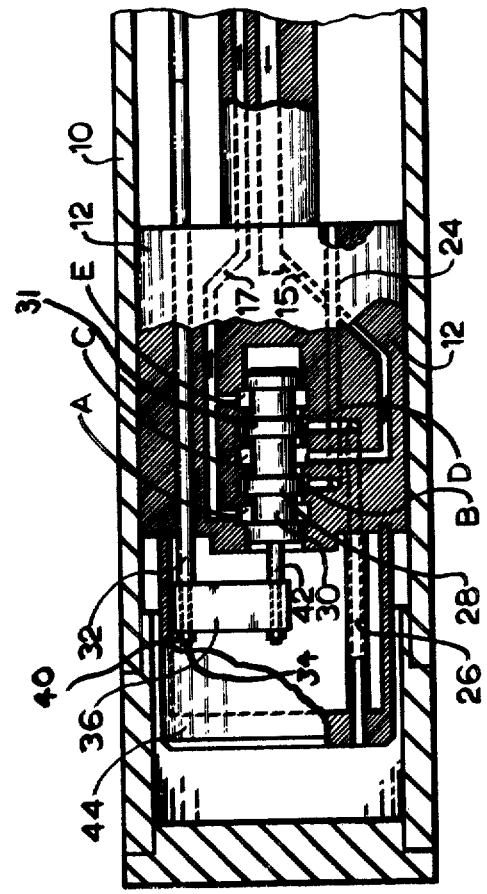

SERVO CONTROL FOR MACHINE TOOLS

This invention relates to the positioning control of a movable machine member such as a machine Tool Table.

As is well known the position of a movable machine member, such as a machine tool table, can be controlled by the relative position of a piston and a cylinder whose relative position is controlled by a servomechanism.

This invention provides a novel combination of a piston and cylinder and a servo-mechanism.

It is an object of this invention to provide such a combination in compact form where the servo-mechanism is mounted on the piston (inside the cylinder) and the flow of hydraulic fluid to control the movement of the piston through bores in the piston rod relative to the cylinder is controlled by a control rod connected to one of the relatively movable elements of the servo-mechanism and arranged to extend out of the cylinder eccentric to the piston rod and mounted both for movement with, and for measured movement relative to, the cylinder. It will be appreciated that the combination of servo-mechanism with the piston, inside the cylinder, together with the provision for hydraulic fluid flow to and from the cylinder through bores in the piston rod, provides a compact construction for control of the position of the movable member of a machine tool, a most suitable arrangement in cramped quarters and for conservation of space. The servo control rod extending parallel to the piston rod, and out of the cylinder, allows a step drive which permits digital input to the servo which is a material advance in servo design.

It is an object of a preferred facet of the invention to provide a design wherein the control rod extends out of the cylinder at the same end as the piston rod, greatly increasing the compactness of the arrangement.

It is an object of a preferred facet of the invention to provide a design wherein the control rod, extending out of the cylinder, is cylindrical in cross-section and is provided with transverse indentations regularly spaced longitudinally along the rod. The rod is adapted to be driven by a stepping motor through a pinion which drives the indented rod in a manner analogous to a rack and pinion drive. The drive used, allows the convenient use of, and application of, digital input to the servo. The rod, because of its cylindrical shape, may be oriented to substitute for the series of indentations in use, another series of indentations giving slightly differing incremental output for the same angular pinion movement input, but for use with the same drive pinion, for calibration purposes, or for the interchange between metric and inch units or vice versa. The cylindrical rod is preferably easily, suitably mountable for replacement, so that the change from one series of indentations to another may be achieved by substitution of one rod for another, rather than the rotation of the rod.

Since, in the preferred embodiment, the indentations on the slidable servo rod extend from inside to outside the cylinder, size limitations on the size of the rod indentations are required to avoid oil leakage. This is discussed in detail hereinafter.

In drawings which illustrate a preferred embodiment of the invention:

FIG. 1 shows a side view, partly in section, of the invention;

FIG. 2 shows a perspective view of the indented rod and the cooperating pinion; and FIG. 3 shows a portion of the structure shown showing two alternatives to the structure in FIG. 1.

In the drawings a cylinder 10 is shown, in which is movable a piston 12. As is well known, one of the cylinder or piston (here the piston) is attached to a stationary tool member and the other of the cylinder or piston (here the cylinder) is attached to the movable machine tool member. Flow of hydraulic fluid to one side or the other of the piston, with return flow from the opposite side, will cause movement of the cylinder (and its attached tool table) in one direction or the other relative to the piston and stationary machine tool member.

The piston rod 14, on which the piston 12 is mounted and which in the preferred embodiment is fixed, is provided with a pair of longitudinally extending bores being: supply bore 18 and return bore 20, extending from adjacent the rod end remote from the piston to the vicinity thereof. The ends of the bores 18 and 20 (which are located to be exterior of the cylinder through the range of movement of the piston rod) are connected to hydraulic oil supply and return means (not shown) as indicated by the arrows. The piston 12 is recessed, preferably toward its free end, to provide the chambers for a valve controlling the flow of oil to one or the other side of the cylinder. The valve used is preferably the spool valve (shown) of well known design.

As is well known, supply oil is provided to groove C of the spool valve which is connected to bore 18 through bore 15 while return oil is taken from grooves A and E which are connected to bore 20 through bore 17. A bore 24 connects groove B to the piston rod side of the piston and bore 26 connects groove D to the opposite side of the piston. The spool 30 is provided with end enlargements to close the chamber and is provided with a pair of intermediate enlargements 28 and 31 which, in the intermediate position shown, close the grooves B and D and the bores 24 and 26 against flow to either side of the piston. When the spool 30 is displaced to the left, relative to the intermediate position and the piston 12, the supply oil from bore 15 is connected to bore 24 and the return oil to bore 26. As will be obvious, the result is to move the cylinder to the right. It will be understood that the 'intermediate position' of the spool relative to the chamber is defined as that where the flow conditions of the supply and return oil will not cause movement of piston relative to cylinder either way.

Conversely, it will be obvious that when the spool 30 is moved to the right, the cylinder is moved to the left.

A control rod 32 is mounted to extend through the same end wall of the cylinder as the piston rod 14 and to extend parallel thereto. The control rod 32 extends slidably through both the piston end wall and the piston 12 itself. The control rod 32, to the left of the piston, is provided with a narrowed free end 34. The rod is attached to a block 36 with the narrowed end 34 of the rod passing through a bore of the block, and a nut 40 screwed on a threaded extent of the outer end of rod 32 to clamp the block against the shoulder formed by the beginning of the threaded portion. A shank 42 extending from the spool 30 through the block 36 is fastened to the latter in a similar manner. Since the rod 32 is substantially parallel to the piston rod, movement of the rod 32 may be and is used to create similar movement in the spool 30.

A housing 44 is provided mounted at the free end of the piston to enclose block 36 and the projecting ends of rod 32 and shank 42.

The rod 32 is controlled as illustrated in FIG. 1. A stepping motor drive pinion 46 is mounted on a shaft 48 mounted on housing 50. The rod 32 extends to be contacted and driven by the pinion 46, being supported in such driving relationship by an idler wheel 52 also mounted on housing 50. As shown in FIG. 2, the rod 32 is cylindrical and is provided with a set of regularly spaced indentations 54 designed to be driven by the pinion 46 in the manner of a gear rack. However, where the rod is formed as taught in my copending application, Ser. No. 289,915 filed Sept. 11, 1972, the performance with regards to accuracy, calibration and back-lash is found to be vastly superior to that of a gear rack. Moreover, a gear rack of standard design would create substantial and intolerable leakage of oil. The indented rod, as described, avoids any substantive leakage of oil where the maximum depth of the indentations is less than 0.002 inches. It will be noted that it is of course quite feasible to have rod 32 project a sufficient distance out of the cylinder to avoid having the indentations pass through the cylinder wall. However, compactness usually requires that the rod be as short as possible, hence the indentations will pass through the cylinder wall, as shown in FIG. 1. Having discussed above the maximum indentation depth to avoid substantial leakage it should also be noted that it is doubtful if proper drive can be achieved with present materials and techniques where the depth is less than 0.0005 inch.

As previously noted, the rod 32 formed as above may be formed with slightly differing series of indentations 54 at different orientations around the rod axis. The substitution of one series of indentations for another may be achieved by loosening nut 40 and rotating the rod to provide a new rack (with the pinion 46 eased off by means not shown but well known to those skilled in the art) for contact with the rod. The nut 40 is then tightened. The pinion 46 may then be optically relocated in mesh with the new series of indentations, although some skilled machinists may do this by eye and touch. As an alternative to rotating the rod for calibration or conversion from inch to metric increments or vice versa, one rod with the necessarily differing rack depths may be substituted for the rod in use, by removal of nut 40 as aforesaid.

It will be noted that the control rod 32 could be extended out of the opposite end of the cylinder from the piston rod although it is found that having the rods extend out of the same end makes a much more compact arrangement.

It will be obvious that it makes no difference if, in the embodiment shown, the cylinder is stationary and the piston moves. In each case care must be taken that the spool valve connections are arranged in a sense that movement of the rod and hence the spool tends to cause resultant movement of the piston relative to the cylinder in such a direction that the spool valve is moved toward intermediate position so that relative movement between the piston and cylinder is stopped when this position is reached.

It will be appreciated that the spool may be attached to the piston and the spool chamber to rod 32 if the connections are made in the proper sense, and that another equivalent flow control device may be substituted for the spool valve, as long as they allow initiation of the movement of the piston relative to the cylinder by movement of rod 32 and modify the flow to stop movement of the piston relative to the cylinder when the movement of piston relative to cylinder causes the spool valve (or equivalent device) to reach its intermediate position.

In operation, therefore, (assuming the spool at the intermediate position and all members stationary) with the device as shown in FIG. 1, operation of the drive, such as a stepping motor through an incremental rotation, will provide incremental rotation of the pinion 46 and the incremental movement of rod 32 (say to the left). Movement of rod 32 to the left causes consequent movement of spool 30, causing movement of the cylinder 10 to the right. The cylinder 10 of course mounts pinion 46, idler 52, rod 32 and the rightward movement of cylinder 10 carries rod 32 and spool 30 to the right relative to the cylinder until the spool has again reached its intermediate position relative to the piston. At this point, motion of the cylinder relative to the piston stops, and the cylinder and the machine tool table (or other machine tool part to which it is connected) have moved through the increment required by the rod at the servo input. Conversely, if the stepping input has been arranged to cause movement of the rod 32 to the right, the flow conditions created would have caused movement of the cylinder 10 to the left. The movement of the cylinder 10 would carry with it the attached machine tool member to the left until the rod 32, also carried by the leftward movement of the cylinder, moves the spool 30 to intermediate position relative to the piston.

As previously discussed, the same or analogous operation occurs when the piston is made movable and connected to the machine tool member, instead of the cylinder; due regard being had, in all cases, to the directions of flow created by movement of the spool in the spool valve.

In FIG. 3 an alternative construction to that shown in FIG. 2 is shown. With the arrangement of FIG. 1, the entire rod 32 must be removed when a new set of calibrations 54 is desired. Replacement of the outer part of the rod is facilitated by the design shown in FIG. 3 by substitution of a two part rod 132 and 132A, for the rod 32. The inner part 132 is slidable through the piston 12 as with the other embodiment and may be permanently fastened to block 36. One of the members (here member 132A) so that when it is desired to substitute one rod with a differing series of indentations for another, only the outer portion 132A need be unscrewed and withdrawn and replaced by another portion 132A similar in structure with a different series of indentations. With the arrangement of FIG. 3 this may be done without dismantling the machine.

Also as shown in FIG. 3, the rod 42 (which in FIG. 1 connects the spool and block 36) may, for the reasons afterward discussed, be replaced by a stiff wire 142. The wire 142 is designed to have the stiffness to provide the column strength to transmit compressive as well as tensile stresses to the spool 30 from rod 32 (or 132A–132B) through block 36 in the normal operation of the servo drive of the spool. However, the wire 142 with its adequate column strength allows small lateral displacement to compensate for small misalignment or dislocations of the servo parts relative to the spool or vice versa. If desired, the alternative construction using the wire 142 or the construction using the rod 42 may be provided with keying means preventing rotation of the spool relative to the rod or preventing misalignment of the inwardly extending part of the rod. Such keying means would of course allow the operational longitudinal sliding of the members but would prevent their lateral displacement.

I claim:

1. A servo-mechanism for control of the position of a piston relative to a cylinder, in a machine tool control system,
- a piston rod, designed to be connected to said piston and constructed to extend out of one end of said cylinder,
- means designed to provide hydraulic fluid supply and return conduits through bores in said piston range and extending from locations located to be on the exterior of said cylinder, (throughout the ange of movement of said piston rod) to said piston,
- said piston being designed and constructed to mount a servo valve comprising two members, relatively movable with respect to each other,
- said two relatively movable members and the fluid conduits in said piston being designed so that: said relatively movable members, at one relative position, direct pressure and return fluid so that said piston is moved in one direction; and so that relatively movable members at another relative position direct pressure and return fluid so that said piston is moved in the opposite direction and defining a position intermediate said relative positions,
- one of said relatively movable members being arranged to be connected to be movable with said piston,
- the other of said relatively movable members being arranged to be connected to be movable with a control rod,
- said control rod being mounted on said cylinder and also movable in measured increments relative thereto, and arranged to extend longitudinally outside of and substantially parallel to said piston rod and to extend from the vicinity of said piston through an end of said cylinder,
- said piston and said relatively movable members being designed so that movement of said control rod relative to said piston in one direction causes flow of oil from and to said supply and return lines, respectively, in a direction which will move said piston relative to said cylinder in a direction to place said relatively movable members in said intermediate position,
- wherein said control rod is arranged to extend out of the same end of said cylinder of said piston rod.

2. A device as claimed in claim 1 wherein means are provided for controlling the movement of said rod relative to the members on which it is mounted to move in measured increments relative thereto.

3. A device as claimed in claim 2 wherein said control rod is substantially cylindrical and is provided with a plurality of equally longitudinally spaced indentations in the surface of said rod and extending transversely thereof relative to the axis and drive means is provided including a gear pinion designed and arranged to mesh with and drive said rod.

4. A piston and cylinder designed to have their relative position determine the position of a machine tool part, combined with a servo for controlling such relative position comprising:
- a piston rod attached to such piston for movement therewith and arranged to extend out one end of said cylinder,
- said piston rod being provided with a pair of bores extending longitudinally therealong, and extending from locations located exterior of said cylinder, one acting as a hydraulic fluid supply line and the other acting as a hydraulic fluid return line,
- an element mounted on said piston to move relative thereto over a range of movement,
- lines for connecting said piston rod bores to the cylinder chambers, arranged so that the flow therein is controller by the position of said relatively movable element relative to said piston so that when said element is located at one end of said range of movement, said supply fluid bore is connected to the cylinder on one side of said piston and the return fluid bore is connected to the other side; and so that when said element is located at the other end of said range of movement, said supply fluid bore is connected to the cylinder on the other side of said piston and said return fluid bore is connected to said one side of said piston, and there is defined a relative position between said element and said piston intermediate the ends of said range of movement,
- a control rod mounted on said cylinder for movement therewith, and also designed to move in measured increments relative thereto; located outside of said piston rod and designed to extend in a direction substantially parallel to said piston rod between one end which extends out of said cylinder and the other end which is connected to said relatively movable element for movement there-with.
- said piston and said relatively movable element being designed so that a predetermined displacement of said element relative to said piston, from said intermediate position, consequent upon displacement of said control rod relative to said piston, causes connection of said supply and return lines with one side and the other of said piston in a sense to cause movement of said piston relative to said cylinder in a direction to tend to return said element to its intermediate relative position,
- wherein said control rod is arranged to extend out the same end of said piston cylinder as said piston rod.

5. A device as claimed in claim 4 wherein means are provided for controlling the movement of said rod relative to the members on which it is mounted, to move in measured increments relative thereto.

6. A device as claimed in claim 5 wherein said control rod is substantially cylindrical and is provided with equally longitudinally spaced indentations in the surface of said rod and extending transversely thereof relative to the axis and drive means is provided including a gear pinion designed and arranged to mesh with and drive said rod.

* * * * *